(12) United States Patent
Lutz

(10) Patent No.: US 6,896,290 B2
(45) Date of Patent: *May 24, 2005

(54) STEERING GEAR SHAFT FOR A STEERING COLUMN OF A MOTOR VEHICLE

(75) Inventor: Christian Lutz, Nüziders (AT)

(73) Assignee: ThyssenKrupp Presta Aktiengesellschaft, Eschen (LI)

( * ) Notice: Subject to any disclaimer, the term of this patent is extended or adjusted under 35 U.S.C. 154(b) by 74 days.

This patent is subject to a terminal disclaimer.

(21) Appl. No.: 10/388,010

(22) Filed: Mar. 13, 2003

(65) Prior Publication Data

US 2003/0173764 A1 Sep. 18, 2003

(30) Foreign Application Priority Data

Mar. 14, 2002 (DE) .......................................... 102 11 743
Oct. 31, 2002 (EP) ............................................. 02024230

(51) Int. Cl.⁷ ................................................. B60D 1/19
(52) U.S. Cl. ...................................................... 280/777
(58) Field of Search ............................. 280/777, 93.51; 74/492; 188/371, 377

(56) References Cited

U.S. PATENT DOCUMENTS

| | | | |
|---|---|---|---|
| 3,508,633 A | | 4/1970 | Nishimura et al. |
| 3,577,621 A | | 5/1971 | De Gain |
| 4,531,619 A | * | 7/1985 | Eckels ......................... 280/777 |
| 5,193,848 A | * | 3/1993 | Faulstroh .................... 280/777 |
| 5,368,330 A | * | 11/1994 | Arnold et al. .............. 280/777 |
| 5,983,695 A | | 11/1999 | Lutz |

FOREIGN PATENT DOCUMENTS

| | | |
|---|---|---|
| CH | 0324476 | 9/1957 |
| DE | 2027638 | 12/1971 |
| DE | 2459246 | 6/1976 |
| DE | 3224308 | 12/1984 |
| DE | 2544769 | 4/1997 |
| DE | 9631214 | 2/1998 |
| EP | 0091671 | 10/1983 |
| EP | 0298832 | 1/1989 |
| EP | 0661117 | 7/1995 |
| EP | 0701070 | 3/1996 |
| EP | 0709274 | 5/1996 |
| EP | 0872401 | 10/1998 |

OTHER PUBLICATIONS

Patent Abstract of Japan JP–59 092254, May, 1984.
European Search Report.

* cited by examiner

Primary Examiner—Paul N. Dickson
Assistant Examiner—Joselynn Y. Sliteris
(74) Attorney, Agent, or Firm—Sidley Austin Brown & Wood, LLP

(57) ABSTRACT

A steering gear shaft for a steering column of a motor vehicle has at least one crash-deformable section formed as a corrugated tube at least a portion of a longitudinal extent of which that contains at least one of corrugation crests of the corrugated tube, is formed of several layers, with a wall thickness of at least one layer in the at least one of the at least one of the corrugation crests and a respective corrugation trough diminishing over a region of the at least one of the corrugation crests and the respective corrugation trough between a side of the corrugation tube adjacent to which a universal joint is provided, and a side of the corrugation tube remote from the universal joint.

22 Claims, 3 Drawing Sheets

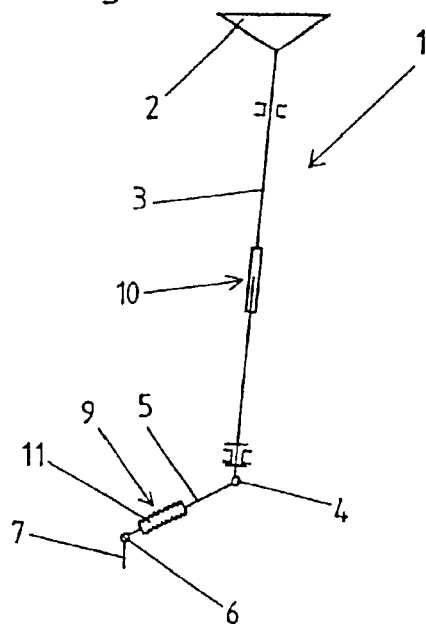
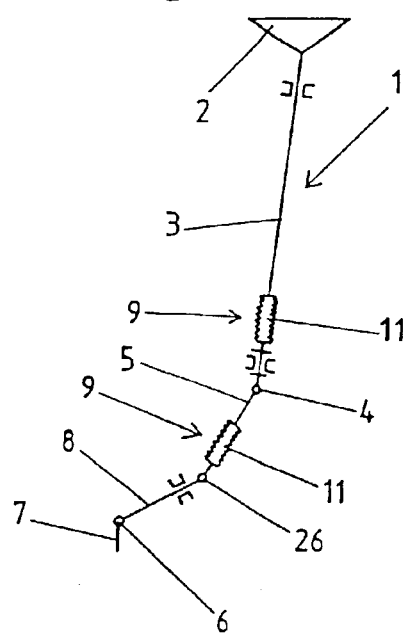
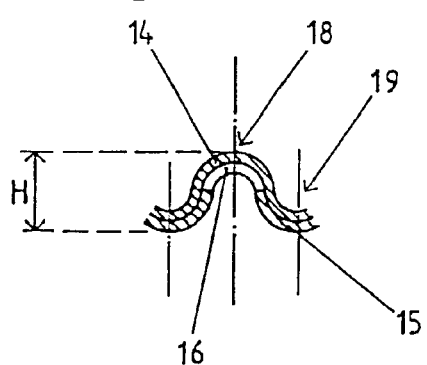
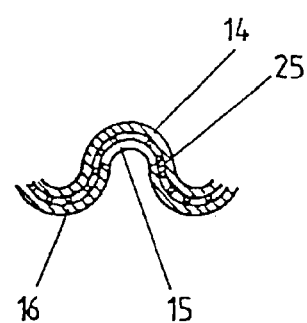
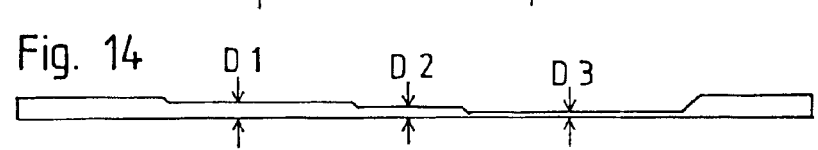
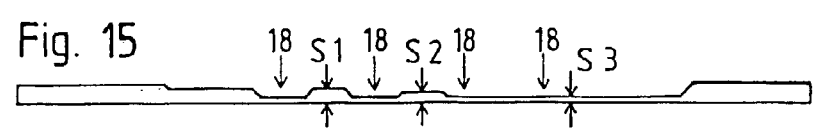

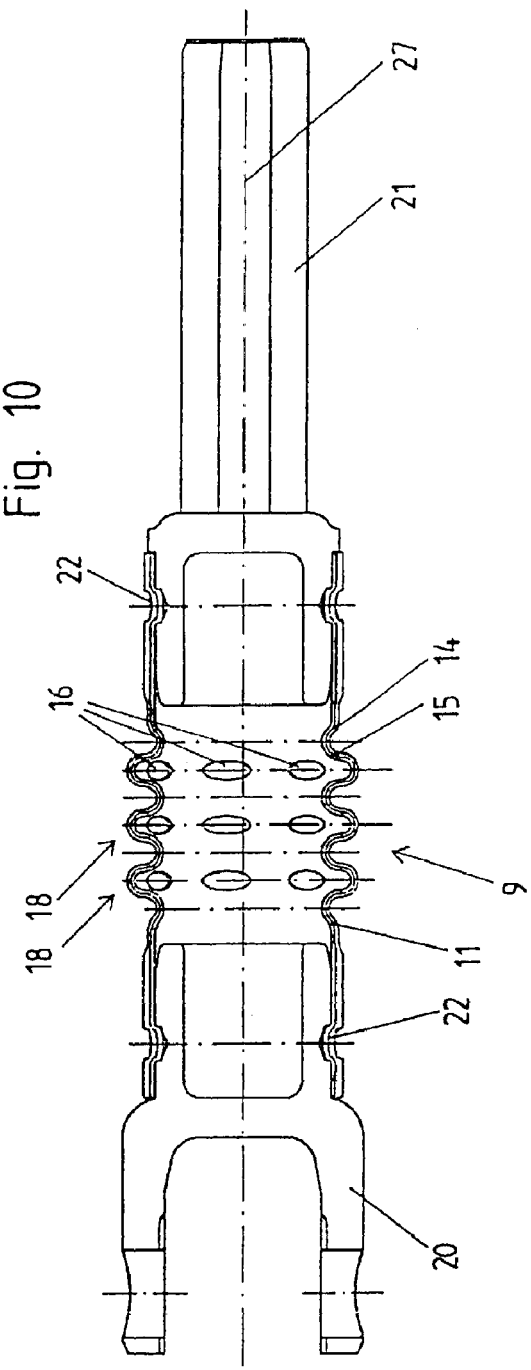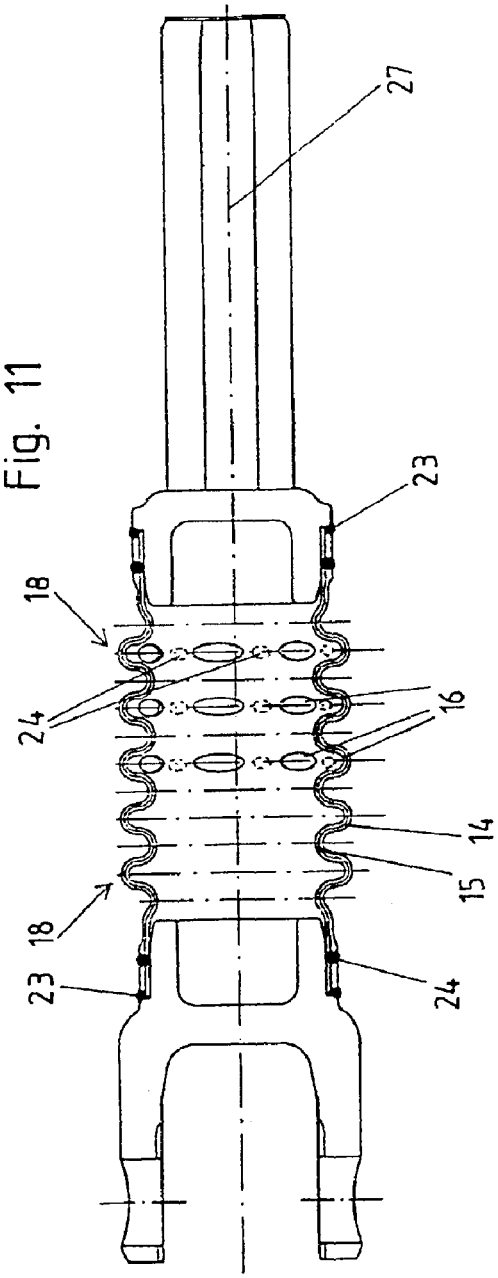

STEERING GEAR SHAFT FOR A STEERING COLUMN OF A MOTOR VEHICLE

BACKGROUND OF THE INVENTION

1. Field of the Invention

The present invention relates to a steering gear shaft for a steering column of a motor vehicle and having at least one crash-deformable section formed as a corrugated tube at least a portion of a longitudinal extent of which that contains at least one of corrugation crests of the corrugation tube, is formed of several layers.

2. Description of the Prior Art

Steering gear shafts of steering columns with deformable sections formed as corrugated tubes are disclosed, e.g., in German Publication DE-196 31 214 A and European Publications EP-0 709 274A1, EP-0 872 401A2, and EP-0 701 070A1. Corrugated tubes, which form the crash-deformable sections, can be arranged in different sections of a steering column. In a steering column, a single corrugated tube can be used or several corrugated tubes can be arranged in different section of the steering column. The corrugated tubes, which function as crash-deformable sections, are compressed axially, on one side, and can be bent sideways under the action of non-axial forces, on the other side.

Different methods of manufacturing of corrugated tubes, which function as crash-deformable sections, are known. Such methods are disclosed, e.g., in European Publication EP-661 117A1, EP-298 832B1, EP-0 782 891 A1, and in German Publication DE-20 27 638A1. A corrugated tube for a steering column, which functions as a crash-deformable section, should meet specific requirements. On one hand, it should be easily deformable in case of a crash to be able to perform its function, with the deformation taking place in a predetermined manner. On the other hand, it should be able to withstand loads acting thereon during a normal operation over its entire service life. Therefore, the corrugated tube should meet very high requirements which should be determined by extensive tests. These test should examine, among others, the stability under the action of torques of predetermined values and under action of static, dynamic, and pulsatory loads. Further, the deformation behavior should be tested. In addition to meeting all of these different requirements, the corrugated tubes have to have as small dimensions as possible for space-saving reasons.

In order to provide for manufacture of corrugated tubes capable of meeting the requirements for crash-deformable section, European Publication EP-0 82 891A1 discloses a method of manufacturing of such corrugated tubes according to which the wall thickness in the region of corrugation trough is increased in comparison with the wall thickness in the region of the corrugation crests. In the region of the corrugation troughs greater loads act on the corrugated tube during transmission of a torque because it is in this region, the wall of the corrugated tube has a smallest distance from the central axis of the corrugated tube.

DE-20 27 638A1 discloses a method of manufacturing of a radially corrugated tube according to which a uniform wall thickness, different wall thickness and/or profile of a corrugated tube can be obtained from shaft to shaft or zonewise. Thereby, a corrugated tube, which functions as a crash-deformable section of a steering gear shaft and having different collapsible zones can be produced.

German Patent DE-32 24 308C2 and Swiss Patent No. 324,476 disclose a corrugated multi-layer metal bellows which is used as a portion of liquid or gas conduits, in particular, for sealingly connecting movable relative to each other, parts. The German and Swiss Patents relate to field remote from and not comparable with steering columns for motor vehicles. They solve different problem and relate to products which have to meet different requirements.

A multi-layer corrugated tube is also disclosed in German Publication DE-25 44 769A1. With the multi-layer, e.g., two-layer corrugated tube, the stability of the tube under the action of a torque acting thereon about its longitudinal axis does not change or changes very little in comparison with conventional, single-layer tube with the same wall thickness, whereas the deformation, in particular, a sideway buckling under the action of non-axial forces takes place when the acting non-axial forces are noticeably smaller. This result in improved crash characteristics in comparison with conventional steering columns during the transmission of high torque. At that, the outer diameter of the corrugated tube can be reduced.

An object of the invention is a steering gear shaft of the type described above and having at least one crash-deformable section formed as a corrugated tube having improved rigidity under the action of a torque acting about the tube longitudinal axis and adequate deformability in case of a crash.

SUMMARY OF THE INVENTION

This and other objects of the present invention, which will become apparent hereinafter, are achieved by providing a steering gear shaft of the type discussed above in which the wall thickness of at least one layer in at least one of the at least one of the corrugation crests and a respective corrugation trough diminishes over a region of the at least one of the corrugation crest and the respective corrugation trough between a side of the corrugation tube adjacent to a universal joint which is provided at one end of the corrugated tube, and a side of the corrugation tube remote from the universal joint.

The present invention improves flexural strength of the corrugation tube in the vicinity of the adjacent universal joint where the greatest bending stresses occur. In case universal joints are provided at both ends of the corrugation tube, the "adjacent universal joint" is a universal joint that is located more closely to the adjacent end of the corrugation tube. E.g., one end of a corrugation tube can be directly connected with the joint yoke of the universal joint, whereas the other end of the corrugation tube can be connected with a connection shaft located between the other end and the corresponding universal joint.

According to an advantageous embodiment of the present invention, at least one of the layers of the corrugation tube can be provided with a plurality of openings in the region of the corrugation crests.

Because the corrugation crests are subjected to less stress during transmission of a torque acting about the tube longitudinal axis as they are being spaced by a greater distance from the longitudinal axis, a crash-deformable section-forming, corrugated tube having improved deformation characteristics with an adequate stability under the torque action is produced. In particular, such a tube is easily bendable under the action of non-linear forces.

The novel features of the present invention, which are considered as characteristic for the invention, are set forth in the appended claims. The invention itself, however both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 1 a schematic view of a first embodiment of a steering column;

FIG. 2 a schematic view of a second embodiment of a steering column;

FIG. 9 a cross-sectional view of the corrugated tube shown in FIG. 7;

FIG. 10 a longitudinal cross-sectional view of a section of a steering gear shaft according to the present invention having a deformable portion formed as a corrugated tube;

FIG. 11 a longitudinal cross-sectional view of a section of a steering gear shaft according to another embodiment of the present invention having a deformable portion formed as a corrugated tube;

FIG. 12 a view similar to that of FIG. 9 of another embodiment of a corrugated tube;

FIG. 13 a schematic view of a middle section of a wall of a corrugated tube with regions having different thicknesses;

FIG. 14 a view similar to that of FIG. 13 of another embodiment of a corrugated tube; and FIG. 15 a view similar to that of FIGS. 13–14 of a further embodiment of a corrugated tube.

DETAILED DESCRIPTION OF THE PREFERRED EMBODIMENTS

Figure 3:
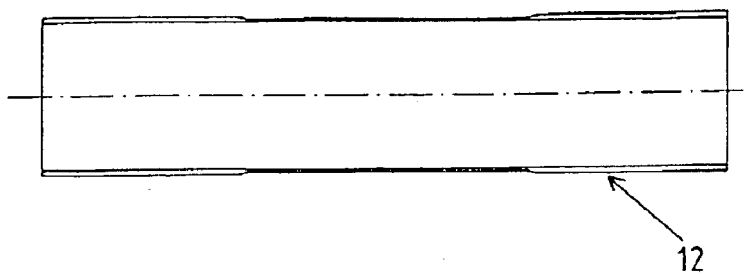
FIG. 3 a schematic view illustrating a first step of manufacturing of a corrugated tube for a steering gear shaft according to the present invention.
Figure 8:
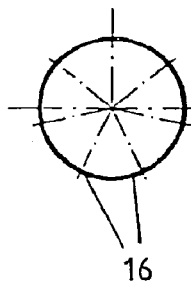
FIG. 8 a cross-sectional view of the corrugated tube shown in FIG. 4.
Figure 4:
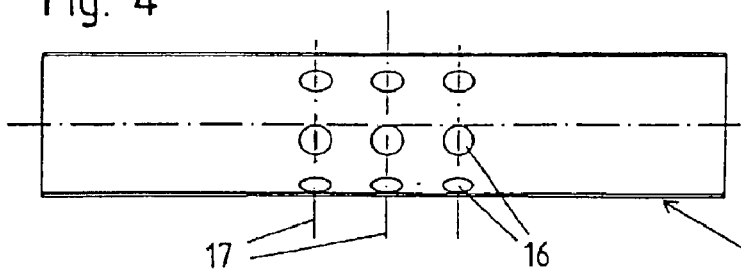
FIG. 4 a schematic view illustrating a second step of manufacturing of a corrugated tube for a steering gear shaft according to the present invention.

FIGS. 1 and 2 show schematically two different embodiments of a steering column 1. In the embodiment shown in FIG. 1, first portion 3 of a steering gear shaft, which adjoins a steering wheel 2, is connected with a second portion 5 of the steering gear shaft by a hinged connection 4 in form of a universal joint. The second portion 5 is also called an intermediate shaft that eventually includes a shock absorber. The second portion 5 is further connected with a pitman arm pin 7 by a hinged connection 6.

In the embodiment of a steering column 1 shown in FIG. 2, a further steering gear shaft portion 8 is provided between the second portion 5 of the steering gear shaft and the pitman arm pin 7. The further third portion 8 is connected with the second portion 5 by a hinged connection 26. The hinged connections 6 and 26 are also formed as a universal joints. The support for the steering gear shaft and the suspension of the steering column on a chassis, which is adjustable in per se known manner, are not shown in detail in FIGS. 1–2 and can be effected in a conventional manner. The inventive steering gear shaft can be also formed differently, i.e., it can have more or less portions 3, 5, and 8.

At least one of the portions 3, 5, and 8 of the steering gear shaft is provided with a section 9, 10 deformable in case of a crash. At least one of the deformable sections 9, 10 is formed as a corrugated tube 11. In addition to the deformable section 9 formed as the corrugated tube 11, the further section 10 can be provided with its length being shortened in another way. e.g., the section 10 can be formed of two telescopic tubes pushed into each other and which, in case of a crash, are axially displaced into each other. The use of tubes telescopically displacing into each other is well known. There can be provided one or more deformable sections 9 formed each as the corrugated tube 11 and arranged in one or more of portions 3, 5, and 8 of the steering column shaft.

Figure 5:
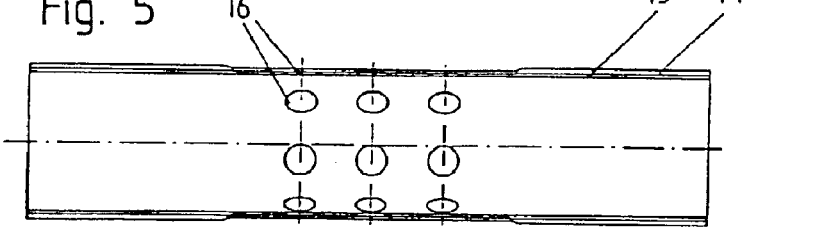
FIG. 5 a schematic view illustrating a third step of manufacturing of a corrugated tube for a steering gear shaft according to the present invention.

A possible process of forming a corrugation tube for a steering column shaft according to the present invention will be briefly explained with reference to FIGS. 3–9 which show consecutive steps of the forming of a corrugation tube. The corrugation tube is formed of two layers over its entire length, with the tube 12, which forms an outer layer 14, having a closed outer surface. In the embodiment shown in the drawings, the tube 12 has ends with an increased thickness. In the region between its opposite ends, the tube 12 has a reduced thickness. In FIG. 3 as well in FIGS. 5–7, 10, and 11, no change of the wall thickness is shown for the sake of clarity. The changes of wall thickness in the intermediate region are shown in FIGS. 13–15. The structure shown in FIGS. 13–15 will be described in detail further below. A tube 13, which forms an inner layer 15, has, in its finished condition, a plurality of openings 16. The openings 16 are arranged, in the finished condition of the tube 13, along imaginary circumferential lines 17 on which in a finished corrugated tube, peaks of the corrugation crests lie, in a spaced relationship to each other. E.g., along each imaginary circumferential line 17, there can be provided, e.g., seven, equidistantly circumferential spaced from each other, openings 16 which, in the embodiment shown in the drawings, have a circular shape. The tube 12 is slided over the tube 13, as shown in FIGS. 5. Then, the inner tube 13 can be expanded by an expanding mandrel so that both layers 14, 15 closely abut each other.

Figure 6:
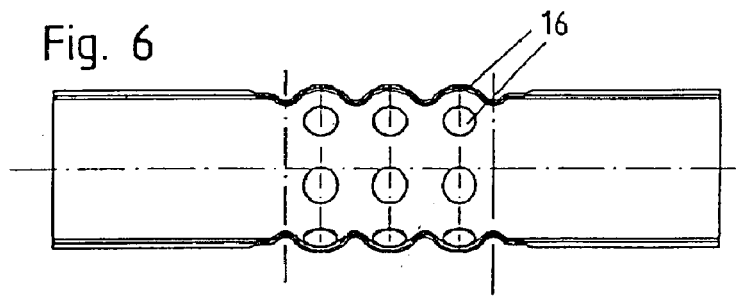
FIG. 6 a schematic view illustrating a fourth step of manufacturing of a corrugated tube for a steering gear shaft according to the present invention.
Figure 7:
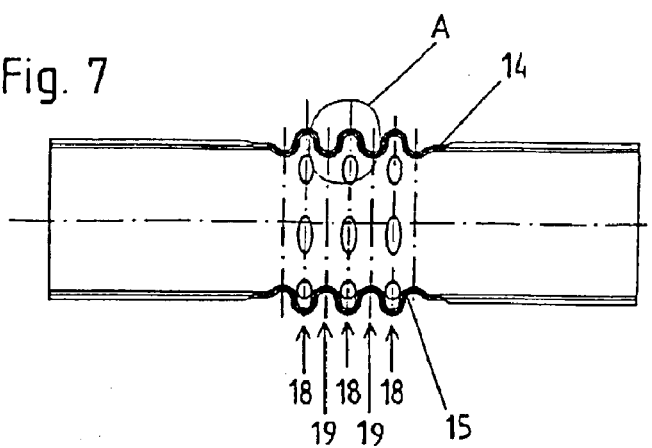
FIG. 7 a schematic view illustrating a fifth step of manufacturing of a corrugated tube for a steering gear shaft according to the present invention.

Then, the corrugations are formed, e.g., by a multistage process, as illustrated in FIGS. 6–7. The tubular wall is provided with a corrugation with the use of shaped tools having a respective corrugation and which are pressed against the tubular wall from inside and outside. For forming a required corrugation, several sets of shaped tools having an increased corrugation depth are used. Then, a tube, which has a shape shown in FIG. 6, is axially compressed, with the tube being supported on a mandrel and with cheek plates being inserted in separate corrugation troughs from outside and displaced, as a result of application of a force, axially toward each other. In the finished tube shown in FIG. 7, a plurality of openings 16 is provided in the region of corrugation crests 18 in the inner layer (tube 13) 15. In the embodiment produced as shown in FIGS. 3–7, all of the corrugation crests have a plurality of openings 16. Advantageously, the corrugation troughs 19 are free from openings 16 (see FIG. 9) at least up to one/fourth of a height H between the corrugation troughs 19 and corrugation crests 18. The closed outer layer 14 prevents, e.g., penetration of a corrosive salt water.

Then, the finished corrugated tube can be arranged in the portion 3, 5 and/or 8 of the steering gear shaft. The corrugated tube 11 can be connected, at one of its ends, with a joint yoke 20, and with a shaft 21 at its other opposite end, as shown in FIG. 10. The corrugated tube 11 is connected formlockingly with the joint yoke 20 and the shaft 21 by knobs 22 engaging in corresponding recesses in the joint yoke 20 and the shaft 21. The knobs 22 prevent both layers 14, 15 of the corrugated tube from displacement in a circumferential direction. Instead, of knobs 22, other forms of formlocking connections can be used, in particular, a press fit connection can be used or a toothing connection.

In the embodiment shown in FIG. 11, the corrugated tube 11 is connected with the joint yoke 20 and the shaft 21 by welds 23 and/or welds 24. The welds 23 and/or 24 also can connect the two layers 14, 15. The welds 23, which can be produced by a laser or ultrasound welding, penetrate both layers 14, 15 and reach the joint yoke 20 and/or the shaft 21. The welds can be used for reliability reasons. The corrugated tube 11 can be formed as one piece with an adjoining portion of the steering gear shaft.

In the embodiment shown in FIG. 11, only a portion of the corrugation crests 18 of the inner layer 15 is provided with openings 16, with the crests 18, which are provided with openings 16, being located in one section of the longitudinal extent of the corrugated tube. The two corrugation crests 18 which are located on a side of the corrugated tube 11 adjacent to the universal joints 6, 20, are free from the openings 16. This is because during a normal operation of the steering gear shaft, it is in this region that the largest non-axial forces, which are produced by the universal joint, namely, bending forces prevail.

Basically, it is also possible to provide openings in the corrugation crests 18 of the outer layer 14. Those openings 24 are shown in FIG. 11 with dash lines. Advantageously, the openings 24 are so offset relative to the openings 16 of the inner layer 15 that they are closed by the inner layer 15 from the interior of the corrugated tube 11.

In principle, with corresponding dimensioning of the layers 14, 15 of the corrugated tube 11, it is possible to provide openings in the region of the corrugation troughs, with the openings in the corrugation troughs and in the corrugation crests being to dimensioned that the weakness, which is produced by openings provided in the region of corrugation troughs, is smaller than the weakness produced by the openings 16, 24 provided in the region of the corrugation crests.

According to the present invention, the corrugation tube can also be formed without the openings 16,24.

As shown in FIGS. 13–15, the tube 12, which forms the outer layer 14, has region with different wall thicknesses in the region where the corrugations are provided. Thus, the finished corrugation tube has corresponding regions with different wall thicknesses. In the embodiment according to FIG. 13, the region of the tube 12, in which the corrugations are formed, has two sections with different wall thicknesses D1 and D2 that stepwise adjoin each other. The section with a layer wall thickness Dt is provided at a side of the corrugation tube adjacent to the adjacent universal joint 6 or 26. The corrugation crests 18 and the corrugation troughs, which are formed in the section with the wall thickness D1, have a greater wall thickness than the corrugation crests and the corrugation troughs formed in the section with the wall thickness D2. When a method is used with which during the formation of the corrugations, the wall thickness in the region of the corrugation troughs is greater than in the region of the corrugation crest, these different changes of the wall thickness are superimposed.

In the embodiment of FIG. 14, the region, in which the corrugations are formed, has three sections with different thicknesses D1, D2, D3, respectively, which stepwise adjoin each other. At that, the wall thickness D2 is greater than the wall thickness D3, and the wall thickness D1 is greater than the wall thickness D2. The adjacent universal joint 6, 26 is located on a side of the section of the tube 12 with the thickness D1.

A further embodiment of the outer tube 12 is shown in FIG. 15. In FIG. 15, the points in which the peaks of the corrugations lie, are shown with arrows 18. Between these corrugation crests, corrugation troughs are located. In the finished condition of the stearing gear, the tube 12 has, at its side adjacent to the adjacent universal joint 6,26, increased wall thicknesses in the region of the corrugation troughs. The first wall thickness S1 is greater than the second wall thickness S2. In the region of the wall between the wall thicknesses S1 and S2 and in the region of the wall located to the right of the thickness S2, the tube 12 has a wall thickness S3. In the finished condition of the corrugation tube 12, the two corrugation troughs, which are located most closely to the adjacent universal joint 6, 26, have a greater wall thickness than the remaining corrugation troughs, with the corrugation trough closest to the universal joint having the greatest wall thickness. Also, the wall thicknesses S1, S2 of the respective corrugation troughs are greater in comparison with the wall thicknesses in the regions of the adjacent corrugation crests. Advantageously, the wall thicknesses in the regions of the corrugation crests is at least by 20% smaller than in the regions of the adjacent corrugation troughs and, preferably, at least by 10% smaller.

Instead of the outer tube 12 or in addition thereto, the inner tube 13 can also have the above-described thickness changes. Thus, in a finished corrugation tube, the wall thickness changes can be observed only in or also in the inner layer.

It is possible to form the two or more layers 14, 15 of the corrugation tube 11 of different materials. Thus, the outer layer 14 can function as a heat shield, and an intermediate material, e.g., in form of a metal mesh or a wire grate 25 (see FIG. 12) can be provided between the outer layer 14 and an inner layer 15 that can be formed from a comparatively low-cost material. To provide for corrosion protection an additional comparatively thin, outer layer can be provided. This layer can be formed of a stainless steel. Generally, all of the layers of a corrugation tube can be formed of a stainless steel.

A multi-layer formation of a corrugated tube can be provided only along a portion of its longitudinal extent, e.g., over the corrugated portion of its longitudinal extent at least a portion of a longitudinal extent of a corrugated tube that has at least one of corrugation crests of the tube, can be formed of several layers. Advantageously, the openings 16 are provided at least in or only in this region of the corrugation tube. Though a two-layer formation is advantageous, one- or three-layer formation of the corrugation tube is also possible. With a three-layer formation, the thickness of separate layers can lie. e.g., in a region of 0.4 mm.

Also, the height H of the corrugation can be changed so that the distance of the corrugation trough from the longitudinal axis 27 of the corrugated tube of one or more corrugation troughs, adjacent to the adjacent universal joint 26, 6 is greater than this distance for the troughs located farther away from the universal joints 6, 26. Thereby, the corrugated tube will be more deflection-resistant in the region adjacent to the adjacent universal joint 26, 6, where the bending forces are greatest, because the corrugation height H is smaller in this region.

The formation of the steering gear shaft according to the present invention permits to adapt it to loads occurring during its normal operation, on one hand, and to specific predetermined crash requirements, on the other hand.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A method of manufacturing of a steering gear shaft including at least one crash-deformable section formed as a corrugated tube, at least a portion of a longitudinal extent of which contains at least one of corrugation crests of the corrugated tube, is formed of at least two layers; and at least one universal joint provided at an end of the corrugated tube, the method comprising the steps of:

providing at least two tubes for forming the at least two layers of the corrugated tube at least one of which has, in a region in which in a completed condition of the corrugated tube, corrugations are formed, regions of different thicknesses with the thicknesses of the different regions diminishing from the end of the corrugated tube at which the at least one universal joint is to be provided to an opposite end;

pushing the two tubes one into the other; and thereafter forming the corrugations, whereby in the completed condition of the corrugated tube, a wall thickness of at least one layer in at least one of the corrugation crests and a respective adjacent corrugation trough diminishes over a region of the at least one of the corrugation crests and the respective adjacent corrugation trough between a side of the corrugation tube adjacent to the universal joint and a side of the corrugation tube remote from the universal joint.

2. A method as set forth in claim 1, wherein the wall thickness of the corrugation tube continuously diminishes at least over a portion of a region of the corrugation crests and the corrugation troughs between the at least one of the corrugation crests and the respective corrugation trough and one of the next corrugation crests and next corrugation trough.

3. A method as set forth in claim 1, wherein the wall thickness in at least one of the corrugation troughs and the corrugation crests changes stepwise.

4. A method as set forth in claim 3, wherein there is provided one of a single step and two steps.

5. A method as set forth in claim 1, wherein a wall thickness of at least one of the layers at least in the region of at least one of the corrugation crests is smaller than in an adjacent corrugation trough.

6. A method as set forth in claim 5, wherein the wall thickness in the region of the at least one of the corrugation crests is at least by 20% smaller than in the adjacent corrugation trough.

7. A method as set forth in claim 1, wherein the wall thickness of the at least one of the layers in each of the corrugation crests is smaller than in adjacent thereto corrugation troughs.

8. A method as set forth in claim 7, wherein the wall thickness in each of the corrugation crests is at least by 10% smaller than in the corrugation trough adjacent thereto.

9. A method as set forth in claim 1, wherein the corrugation tube is formed of the at least two layers along an entire longitudinal extent thereof.

10. A method as set forth in claim 1, wherein a plurality of openings is provided in a region of the corrugation crest in the at least one of the layers.

11. A method as set forth in claim 1, wherein a plurality of openings, which are spaced from each other in the circumferential direction of the corrugation tube, is provided in the at least one of the corrugation crests.

12. A method as set forth in claim 11, wherein several of the corrugation crests are provided with openings spaced from each other in the circumferential direction of the corrugation tube.

13. A method as set forth in claim 12, wherein a corrugation crest adjoining the end of the corrugation tube adjacent to the universal joint is free from openings in all of the layers.

14. A method as set forth in claim 13, wherein several corrugation crests adjacent to the end of the corrugation tube adjacent to the universal joint, are free from the openings.

15. A method as set forth in claim 14, wherein corrugation troughs are free from openings at least up to one/fourth of a height between a corrugation trough and a corrugation crest.

16. A method as set forth in claim 1, wherein the layers are made of different materials.

17. A method as set forth in claim 1, wherein the outer layer is one formed of a corrosion-resistant material and has a corrosion-proof coating.

18. A method as set forth in claim 17, wherein the outer layer is formed of stainless steel.

19. A method as set forth in claim 17, wherein the outer layer is formed of a heat-resistant material.

20. A method as set forth in claim 1, wherein a spacing material is provided between the at least two layers over at least a section of a length of the corrugation tube.

21. A method as set forth in claim 20, wherein the spacing material is formed of one of metal mesh and wire grate.

22. A method as set forth in claim 1, wherein a height of corrugation crests changes over a corrugated region, and wherein a distance of a corrugation trough, which is located more closely to the universal joint, from a longitudinal axis of the corrugation tube is greater than a distance from the longitudinal axis of a corrugation trough located farther away from the universal joint.

* * * * *